United States Patent
Won et al.

(10) Patent No.: US 10,412,725 B2
(45) Date of Patent: Sep. 10, 2019

(54) METHOD AND APPARATUS FOR COOPERATION BETWEEN BASE STATIONS

(71) Applicant: Samsung Electronics Co., Ltd., Gyeonggi-do (KR)

(72) Inventors: Sung Hwan Won, Seoul (KR); Songyean Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 20 days.

(21) Appl. No.: 15/105,391

(22) PCT Filed: Jan. 13, 2015

(86) PCT No.: PCT/KR2015/000342
§ 371 (c)(1),
(2) Date: Jun. 16, 2016

(87) PCT Pub. No.: WO2015/108317
PCT Pub. Date: Jul. 23, 2015

(65) Prior Publication Data
US 2016/0316467 A1    Oct. 27, 2016

(30) Foreign Application Priority Data

Jan. 16, 2014   (KR) .................. 10-2014-0005730
Apr. 10, 2014   (KR) .................. 10-2014-0043057

(51) Int. Cl.
*H04W 72/04* (2009.01)
*H04W 24/10* (2009.01)
(Continued)

(52) U.S. Cl.
CPC ....... *H04W 72/0426* (2013.01); *H04W 24/08* (2013.01); *H04W 24/10* (2013.01); *H04W 88/08* (2013.01); *H04W 92/20* (2013.01)

(58) Field of Classification Search
CPC .............................................. H04W 72/0426
See application file for complete search history.

(56) References Cited

U.S. PATENT DOCUMENTS

| | | | |
|---|---|---|---|
| 8,660,570 B2 * | 2/2014 | Han | H04W 24/02 370/331 |
| 2010/0075681 A1 * | 3/2010 | Olofsson | H04W 36/0061 455/436 |
| 2010/0311407 A1 | 12/2010 | Yao et al. | |
| 2011/0294527 A1 | 12/2011 | Brueck et al. | |

(Continued)

FOREIGN PATENT DOCUMENTS

| | | |
|---|---|---|
| CN | 101568196 | 10/2009 |
| CN | 101778409 | 7/2010 |

(Continued)

OTHER PUBLICATIONS

PCT/ISA/210 Search Report issued on PCT/KR2015/000342 (pp. 3).

(Continued)

*Primary Examiner* — Jason E Mattis
(74) *Attorney, Agent, or Firm* — The Farrell Law Firm, P.C.

(57) ABSTRACT

The present invention relates to a method and apparatus for eliminating and improving issues that can occur during the execution of the cooperation between base stations in a wireless communication. The method comprises the steps of: identifying whether at least one cell among cells belonging to a counterpart base station is located in the vicinity of a base station; determining, according to a result of the identifying, whether to include information on a neighboring cell in a base station-related message; and transferring the base station-related message to the counterpart base station according to the determination.

12 Claims, 8 Drawing Sheets

(51) Int. Cl.
*H04W 24/08* (2009.01)
*H04W 88/08* (2009.01)
*H04W 92/20* (2009.01)

(56) References Cited

U.S. PATENT DOCUMENTS

| | | | |
|---|---|---|---|
| 2012/0071169 A1 | 3/2012 | Olofsson et al. | |
| 2012/0135771 A1* | 5/2012 | Futaki | H04B 7/024 455/509 |
| 2014/0162660 A1 | 6/2014 | Loborg et al. | |
| 2014/0228031 A1* | 8/2014 | Masini | H04W 36/0083 455/436 |
| 2014/0301277 A1* | 10/2014 | Ueda | H04W 24/02 370/328 |

FOREIGN PATENT DOCUMENTS

| | | |
|---|---|---|
| CN | 101784066 | 7/2010 |
| KR | 1020150015358 | 2/2015 |
| WO | WO 2013/010566 | 1/2013 |

OTHER PUBLICATIONS

PCT/ISA/237 Written Opinion issued on PCT/KR2015/000342 (pp. 5).
3GPP TSG-RAN WG3 #61bis, Sep. 30-Oct. 3, 2008, Prague, Czech Republic, Neighbor Information Exchange over X2, pp. 5.
Chinese Office Action dated Feb. 28, 2019 issued in counterpart application No. 201580004746.2, 16 pages.

* cited by examiner

FIG. 2
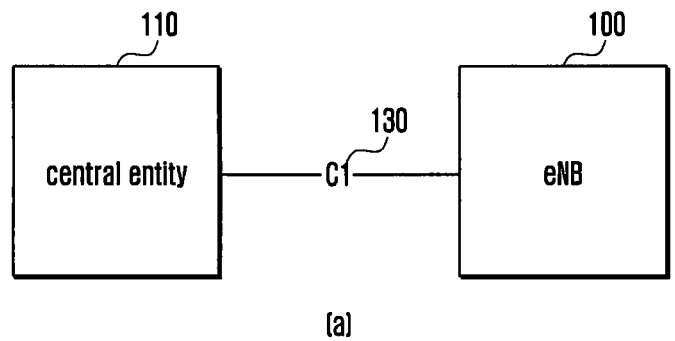
(a)
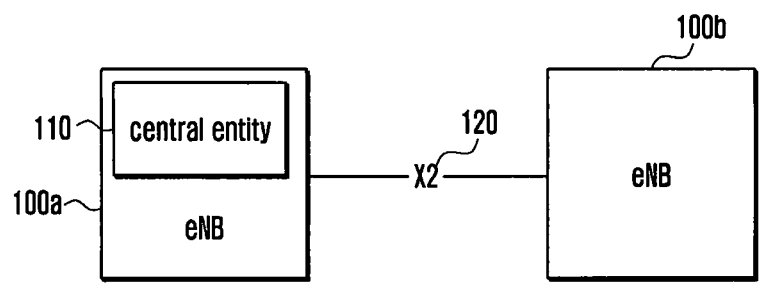
(b)
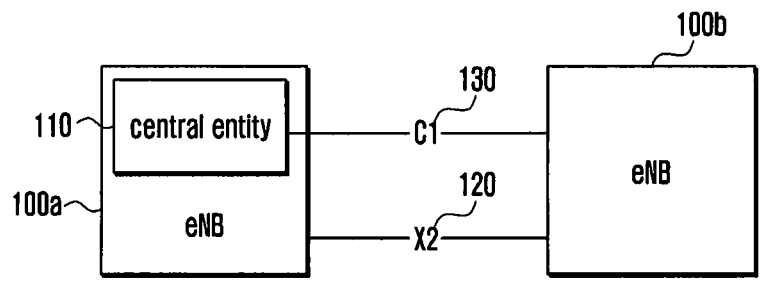
(c)

METHOD AND APPARATUS FOR COOPERATION BETWEEN BASE STATIONS

PRIORITY

This application is a National Phase Entry of PCT International Application No. PCT/KR2015/000342, which was filed on Jan. 13, 2015, and claims priority to Korean Patent Application No. 10-2014-0005730, which was filed on Jan. 16, 2014 and Korean Patent Application No. 10-2014-0043057, which was filed on Apr. 10, 2014, the contents of each of which are incorporated herein by reference.

BACKGROUND

1. Field of the Disclosure

The present invention relates to a method and apparatus for removing or improving issues that may occur when cooperation between base stations is performed in a wireless communication system.

2. Description of the Related Art

Wireless communication systems were developed to provide communication services which support the mobility of users. To this end, wireless communication systems employ the concept 'cell' and divide real space into virtual areas, i.e., cells, where electromagnetic waves with corresponding intensities are used to communicate between a base station and terminals, so that users can receive communication services via a radio channel.

Due to the features of electromagnetic waves, the edge of a cell far apart from a source of electromagnetic waves receives a relative low intensity of electromagnetic waves and is affected by the neighboring cells, so that it cannot provide an ideal service environment. This phenomenon is called interference by neighboring cells. In recent years, cells have been laid out in various ways. For example, small-sized cells are established sporadically in relatively large sized cells. Therefore, there are a varied amount of interference environments.

In order to adapt to various interference environments and provide users with improved services, a wireless communication system based on inter-cell cooperation has been introduced. For example, Coordinated Multi-Point Transmission and Reception (CoMP) and Carrier Aggregation (CA) managed by 3rd Generation Partnership Project (3GPP) are employed to implement wireless communication system based on inter-cell cooperation.

In order to perform cooperation between base stations that belong to different cells, the base stations need to exchange information regarding cells with each other. Exchanging information between base stations may be performed via an interface that directly connects the base stations or via a number of interfaces through at least one of the other entities between the base stations.

The greater the number of cells and the number of base stations participating in inter-cell cooperation and inter-base station, the more base stations obtain information regarding each other's cells. Since cell identifiers assigned to cells to identify between cells are limited in range, if one base station obtains more information regarding a cell of another base station, it may confuse one cell with another.

In the present disclosure, a base station may refer to at least one of the following: an evolved Node B (eNB), Node B (NB) or Radio Network Subsystem (RNS) including NB, Base Transceiver Station (BTS) or Base Station Subsystem (BSS) including BTS, Home eNB, Home NB, Home eNB Gateway (GW), X2 GW, etc.

In addition, one base station is configured with one or more cells. The term 'base station' refers to a 'device or entity' for managing or controlling a cell. For the sake of convenience, the term 'base station' may also be used in the sense of 'cell.'

SUMMARY

The present invention has been made to address the above problems and disadvantages, and to provide at least the advantages described below. Accordingly, the present invention provides a method and apparatus for removing confusion of a cell identifier of a cell and the same cell identifier of the neighboring different cells. The present invention also provides a method and apparatus for a base station to report a resource utilization status to a central entity. The present invention also provides a method and apparatus for negotiating a Stream Control Transmission Protocol (SCTP) mode between a central entity and a base station which exchanging information with each other at a relatively short cycle.

In accordance with an aspect of the present invention, a method for a base station to transfer base station-related messages to a peer base station is provided. The method includes: identifying whether at least one cell under the peer base station neighbors the base station; determining whether to include information regarding a neighboring cell in the base station-related message, based on the identification result; and transferring the base station-related message to the peer base station, based on the determination result.

In accordance with another aspect of the present invention, a base station configured to transfer base station-related messages to a peer base station is provided. The base station includes: an interface for communicating with the peer base station; and a controller for: identifying whether at least one cell under the peer base station neighbors the base station; determining whether to include information regarding a neighboring cell in the base station-related message, based on the identification result; and transferring the base station-related message to the peer base station, based on the determination result.

In accordance with another aspect of the present invention, a method for a base station to allocate resources to a terminal is provided. The method includes: exchanging resource allocation information with a central entity; reporting, if receiving a report on a channel measurement result from the terminal, information considered scheduling to the central entity; and performing, if receiving allocated resources for transfer of data from the central entity, resource allocation for transfer of data to the terminal.

In accordance with another aspect of the present invention, a base station configured to allocate resources to a terminal is provided. The base station includes: an interface for communicating with the terminal or a central entity; and a controller for: exchanging resource allocation information with the central entity; reporting, if receiving a report on a channel measurement result from the terminal, information considered scheduling to the central entity; and performing, if receiving allocated resources for transfer of data from the central entity, resource allocation for transfer of data to the terminal.

According to an embodiment of the present invention, information regarding a cell in a base station and/or a neighboring cell of the cell in a base station is differently adjusted and transferred, so that the peer base station can efficiently perform a PCI confusion mechanism. According to another embodiment of the present invention, a central entity is capable of receiving a report of a resource utilization status from a base station. According to another embodiment of the present invention, when a base station attempts to connect to another base station, based on Transport Network Layer (TL) information received from a node of a core network, it may determine an SCTP mode or a TL protocol for the connection to the other base station.

BRIEF DESCRIPTION OF DRAWINGS

FIGS. 2a to 2c show diagrams of types of connection between an eNB and a central entity.

DETAILED DESCRIPTION

Embodiments of the present invention are described in detail referring to the accompanying drawings. The same reference numbers are used throughout the drawings to refer to the same or similar parts. Detailed descriptions of well-known functions and structures incorporated herein may be omitted to avoid obscuring the subject matter of the invention.

In the following description, embodiments of the present invention are explained based on Long Term Evolution (LTE) and Evolved Packet Core (EPC), as a core network, and Radio Access Network defined in the specification of 3GPP; however, it should be understood that the subject matter of the present invention can also be applied to other communication systems that have similar technical backgrounds to the present invention. It will be also appreciated by those skilled in the art that the embodiments may be modified and the modifications may also be applied to other communication systems, without departing from the scope of the present invention.

Cooperation between eNBs may be made by each eNB in a distributed way or centralized way. In order to have a meaning in inter-eNB cooperation, individual eNBs need to operate according to preset rules. When eNBs operate following their own rules that differ from preset rules, inter-eNB cooperation does not have any meaning. In this respect, cooperation in a centralized way is more advantageous because it can easily control eNBs to collectively operate as preset rules, thereby producing a better performance. In the present disclosure, embodiments are described based on the centralized way. It would be appreciated to those skilled in the art that, when the number of eNBs participating in cooperation in a centralized way is reduced and eNBs frequently cooperate in a centralized way, the cooperation becomes the same as cooperation in a distributed way.

Figure 1:
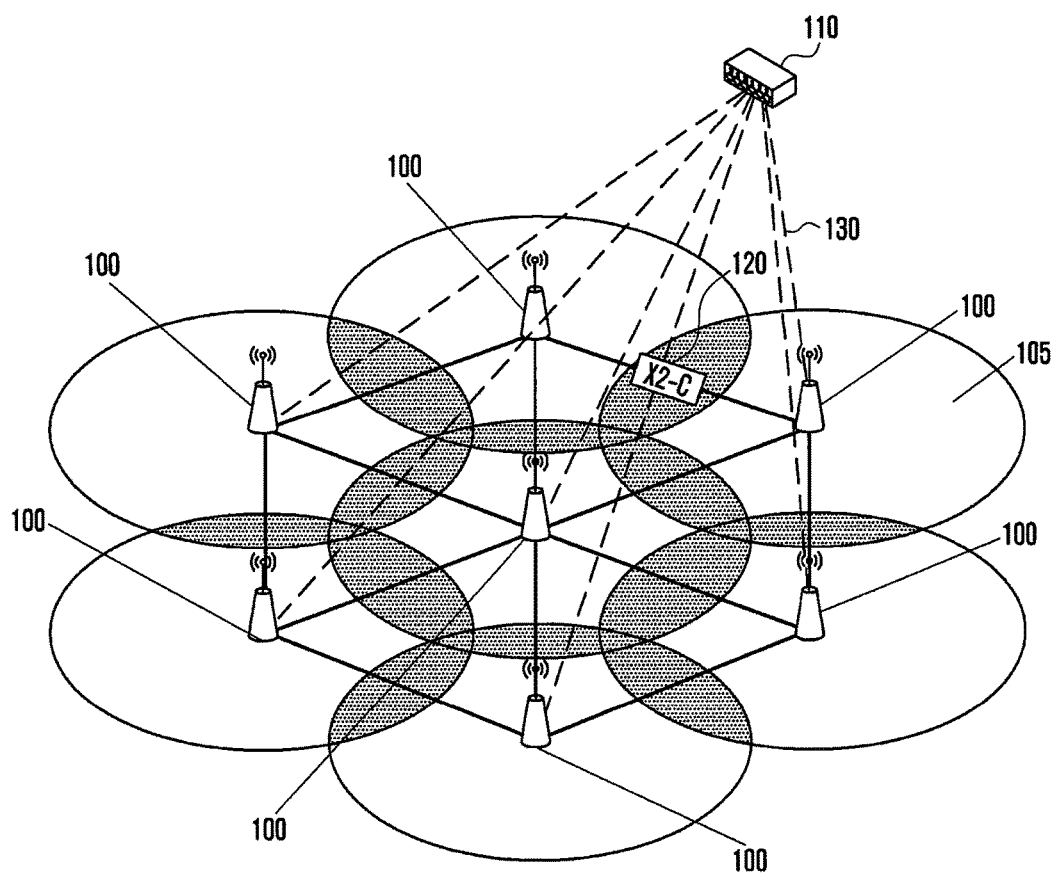
FIG. 1 is a diagram showing the connection between entities each of which includes an eNB to make an inter-eNB cooperation.

FIG. 1 is a diagram showing the connection between entities each of which includes an eNB to make an inter-eNB cooperation.

Referring to FIG. 1, eNBs 100 have their respective coverages 105. A coverage 105 may be defined as an area where one or more cells under eNB 100 can provide services over a preset level of quality. The eNBs 100 are connected to each other via an X2-C interface 120. When the eNBs 100 make an inter-eNB cooperation in centralized way, a central entity 110 may connect to the eNBs 100 via specific interfaces 130. For the sake of convenience, the specific interfaces 130 are called C1 interfaces.

Although FIG. 1 illustrates that individual eNBs 100 have coverages 105 which are the same in size and shape, it should be understood that the eNBs 100 may have coverages 105 which differ in size and shape from each other. In addition, the coverages 105 of individual eNBs 100 may be overlapped, producing overlapping regions various in shape. For example, the coverage 105 of one eNB 100 may be overlaid to be within the coverage 105 of another eNB 100.

FIGS. 2a to 2c show diagrams of types of connection between an eNB 100 and a central entity 110.

The type of connection shown in FIG. 2a represents the connection shown in FIG. 1. The connection between a central entity 110 and eNB 100 may be established in various types, as in FIG. 2b and FIG. 2c. Since the central entity 110 and the eNB 100 refer to logical entities for performing particular functions, they can be physically located at various places.

Referring to FIG. 2b, the central entity 110 may be located in the eNB 100a. The eNB 100a is capable of receiving information from another eNB 100b via an X2 interface 120 and transferring the information to the central entity 110, so that the central entity 110 can perform a corresponding function. The central entity 110 is capable of transferring information to the other eNB 100b via the eNB 100a. The transferred information may have a form of Information Element (IE).

Referring to FIG. 2c, the central entity 110 may be located in the eNB 100a as the type of connection shown in FIG. 2b. The type of connection shown in FIG. 2c differs from that of FIG. 2b, in that a C1 interface 130 is defined between the central entity 110 and the other eNB 100b and allows them to directly exchange information with each other.

The central entity 110 or the eNB 100 is capable of performing one or more of the following functions:

collecting information considered scheduling from one or more eNBs;

allocating resources for transfer of data to individual eNBs, using the collected information;

allocating resources for transfer of data to individual cells, using the collected information;

allocating resources for transfer of data to individual UE devices, using the collected information;

transferring resource allocation information to one or more eNBs;

selecting a set of cells and/or eNBs to participate in cooperation; and allocating resources to transfer, to eNBs, Reference Signal (RS), e.g., Common Reference Signal (CRS), Channel State Information RS (CSI-RS), Demodulation RS (DMRS), Sounding RS (SRS), etc.

When an eNB 100 performs at least one of the functions listed above, this is considered to be a case where the central entity 110 is located in the eNB 100.

When a central entity 110 is located in an eNB 100a, the eNB 100a serving as the central entity 110 may be determined by a network configuration. In addition, a general eNB 100*b* which does not serve as a central entity 110 may also be determined by a network configuration. Alternatively, an eNB 100*a* serving as a central entity 110 and a general eNB 100*b* may be set by an entity for performing Operation, Administration and Maintenance (OAM). In addition, a general eNB 100*b* may acquire a transmission address to the eNB 100*a* serving as a central entity 110 via an OAM entity or a network configuration method.

Cell Identifier Confusion

Figure 3:
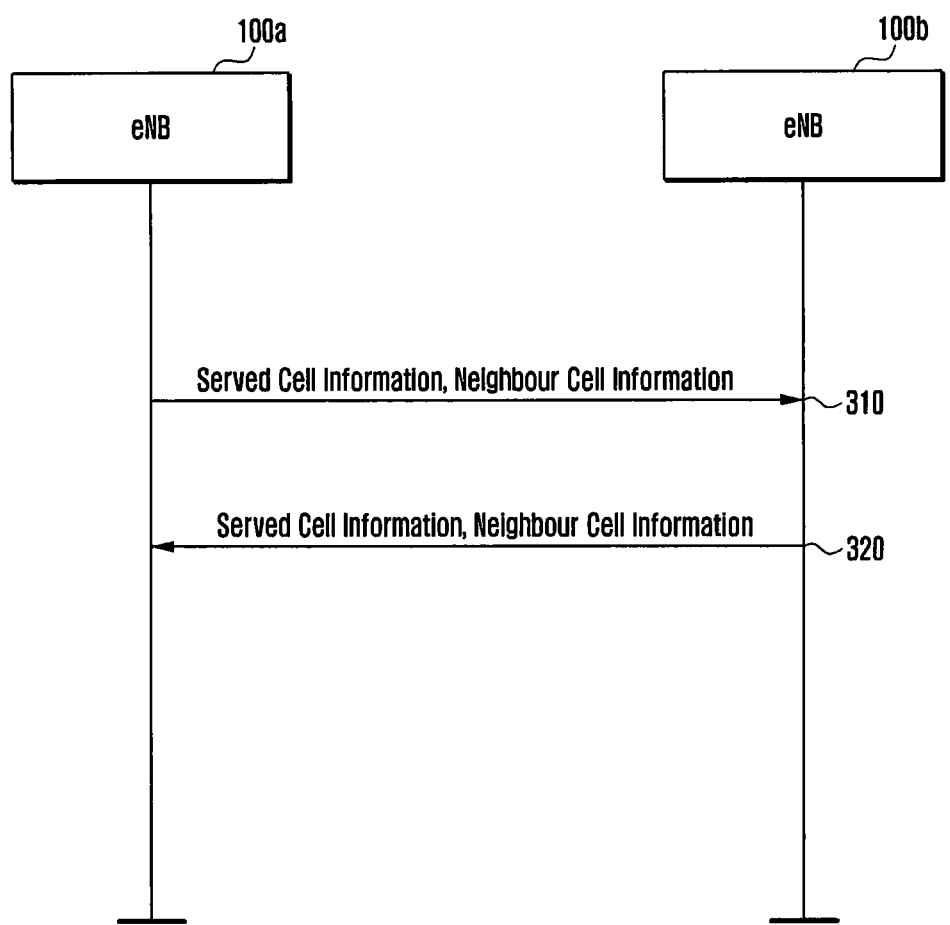
FIG. 3 is a flowchart that describes a method of exchanging information between eNBs.

FIG. 3 is a flowchart that describes a method of exchanging information between eNBs 100.

Referring to FIG. 3, eNBs 100 exchange messages with each other (transfer/receive messages to/from each other), thereby exchanging corresponding information with each other. In the embodiment, eNBs 100 are distinguished from each other by representing one eNB 100*a* and another eNB 100*b*. In this embodiment, eNB 100*a* and eNB 100*b* are the same in type, distinguished by different reference numbers, but are not used to represent a condition as to whether it includes a central entity 110.

The eNB 100*a* transfers a message to eNB 100*b* in operation 310. The message may be an X2 setup request message, X2 SETUP REQUEST, and/or an eNB configuration update message, eNB CONFIGURATION UPDATE. In addition, the message may also contain at least one of the following: a Cell Global Identifier (CGI) (an ECGI for LTE) and a Physical Cell Identifier (PCI) of a cell under the eNB 100*a* and a CGI and a PCI of a neighboring cell of the cell under the eNB 100*a*.

The eNB 100*b* transfers a response message to the eNBa 100*a* in operation 320. The response message may be an X2 setup response message, X2 SETUP RESPONSE, or an eNB configuration update acknowledgement message, eNB CONFIGURATION UPDATE ACKNOWLEDGEMENT. In addition, the message may also contain at least one of the following: a CGI and a PCI of a cell under the eNB 100*b* and a CGI and a PCI of a neighboring cell of the cell under the eNB 100*b*.

The eNBs 100 are capable of performing a mechanism to remove PCI confusion using a PCI a cell under a peer eNB and/or a PCI of a neighboring cell of the cell under a peer eNB, obtained via the X2 Setup process and/or eNB Configuration Update process.

In general, the information that the eNB 100*a* has collected via operations 310 and 320 may be information regarding an eNB 100*b* neighboring the eNB 100*a*. Therefore, the eNB 100*a* is capable of performing a mechanism to remove PCI confusion, using information obtained via the X2 Setup process and/or eNB Configuration Update process.

A PCI may have one of the integers, 0~503, and is used to identify a cell between an eNB 100 and user equipment (UE) (terminal). Since the PCI has only 504 types of identifiers, part of the cells managed by one operator may have the same PCI, although the cells differ from each other. As such, when the different cells having the same PCI exist around a cell, this may cause PCI confusion in the cell.

Regardless of whether a central entity 110 is located in an eNB 100, the central entity 110 may be directly or indirectly connected to the eNB 100 that it geographically neighbors, is close to, or is far apart from. Being far apart between one entity A and another B may be analyzed with various meanings. In an embodiment, when an entity A is located far apart from another entity B, it may mean that: UE receiving services from an eNB/a cell that the entity B belongs to is located in a place where the UE cannot recognize the entity B; and/or UE receiving services from an eNB/a cell that the entity A belongs to is located in a place where the UE cannot recognize the entity A.

In the foregoing description, a method of exchanging information between eNBs 100 is explained and a connection between eNBs 100 located far apart from a central entity 110 is explained. When a central entity 110 is included in an eNB 100*a* shown in FIG. 2*b* and FIG. 2*c*, or when a central entity 110 is included in an eNB 100*a* but is not connected to another eNB 100*b* as shown in FIG. 2*c*, the eNB 100*a* is capable of collecting information regarding a neighboring eNB 100*b* neighboring thereto and information regarding a remote eNB 100*b* located far apart therefrom. The collected information may contain at least one of the following: a CGI and a PCI of a cell under the eNB 100*b* and a CGI and a PCI of a neighboring cell of the cell under the eNB 100*b*.

Therefore, the eNB 100*a* may attempt to remove PCI confusion using information received from other eNBs 100*b* which do not neighbor thereto. That is, when the eNB 100*a* removes PCI confusion using information received from remote eNBs 100*b* located far apart therefrom, the removal process may be inefficient because the eNB 100*a* considers even a cell which does not need to be considered as removal of PCI confusion.

The eNB 100*b* may also receive information the eNB 100*a* including a central entity 110. Since the eNB 100*a* serves as a central entity 110, it may be connected to a number of eNBs via X2 interfaces. Therefore, when the eNB 100*b* considers removing PCI confusion, using information received from the eNB 100*a*, the removal process may be inefficient because the eNB 100*b* considers even a cell which does not need to be considered as removal of PCI confusion. When the eNB 100*a* is connected with more than a few hundreds eNBs, PCI confusion is inevitably caused. This is because the number of types of PCI is only 504.

In order to resolve the problem, a method of managing a list of cells or eNBs neighboring the eNB 100, an X2 setup process, and/or an eNB configuration update process are altered as follows.

When an eNB 100 performs transfer of information regarding a neighboring cell, the eNB 100 may adjust "information regarding the cell under the eNB 100 and/or the neighboring cell of the cell under the eNB 100" according to a type of peer eNB, via an X2 setup process and/or an eNB configuration update process. Therefore, this operation makes the peer eNB efficiently perform a PCI confusion mechanism. That is, this operation prevents the peer eNB from performing a PCI confusion mechanism using an unnecessary PCI.

The eNB 100 is capable of managing one or more of the following lists:
- a list of eNBs connected to each other via X2;
- a list of cells under eNBs connected to each other via X2;
- a list of cells that received a report (on measurement-related information) from UE;
- a list of cells under other eNBs from which eNB 100 heard related information over the air;
- a list of cells set by network configuration, OAM and/or other various methods;
- a list of cells contained in a Neighbor Relation Table (NRT); and
- a list of cells created by a neighbor management method that the eNB 100 performs without considering a central entity 110.

The eNB 100 may also manage a combination of two or more lists described above.

In the X2 setup process and/or the eNB configuration update process, the eNB 100 may not transfer information regarding cells neighboring the eNB 100 to eNBs which do not include cells of the list of neighboring cells. The eNB 100 may transfer information regarding a list of its neighboring cells to eNBs which include cells of the list of neighboring cells.

The information regarding a list of cells neighboring the eNB 100 may contain at least one of the lists managed by the eNB 100, e.g., a list of cells that the eNB 100 has received from UE, a list of cells under other eNBs from which eNB 100 heard related information over the air, and a list of cells set by network configuration, OAM and/or other various methods. In addition, a new attribute, e.g., cells nearby, is created in the NRT, and a cell of which the attribute is checked is considered a neighboring cell of the eNB 100. The schemes for managing a list of eNBs 100 described above may further include definition as to 'cells nearby' individual eNBs (manufacturers, release versions). For example, according to the schemes for managing a list of eNBs 100 described above, the list of cells neighboring the eNB 100/cell may correspond to a list of cells which is considered when the eNB 100/cell sets parameters, NeighCellConfig.

Figure 4:
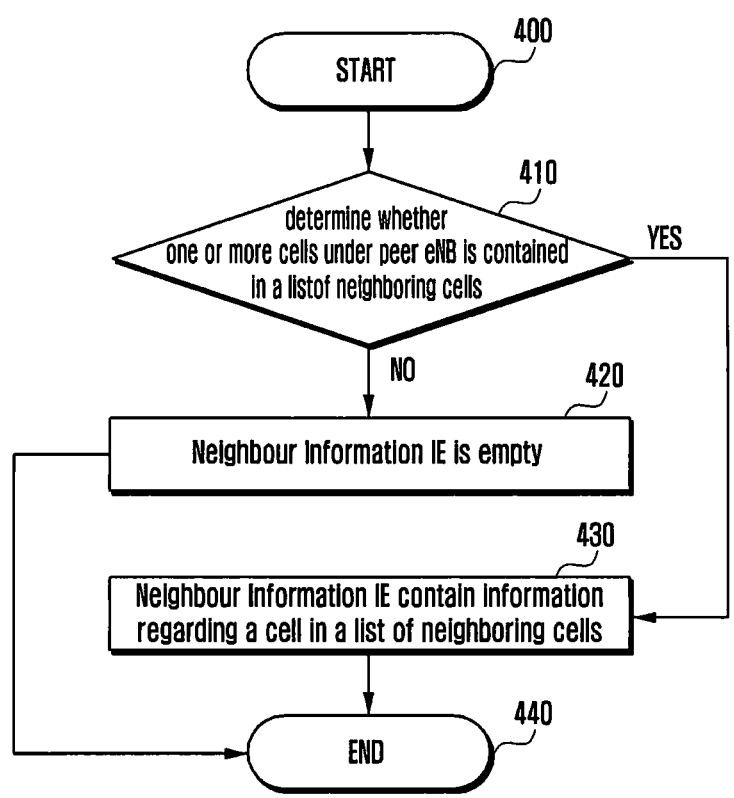
FIG. 4 is a flowchart that describes a method of modifying a message transferred to a peer eNB.

FIG. 4 is a flowchart that describes a method of modifying a message transferred to a peer eNB.

The eNB 100 is in a state where it may transfer information regarding a neighboring cell to another eNB in operation 400. The information regarding a neighboring cell may be at least one of the following: an X2 setup request message, X2 SETUP REQUEST, an X2 setup response message, X2 SETUP RESPONSE, and an eNB configuration update message, eNB CONFIGURATION UPDATE. In the present disclosure and the appended claims, the messages are called base station-related message or eNB-related messages. The eNB 100 proceeds with operation 410.

The eNB 100 is capable of determining whether at least one of the cells under the peer eNB is contained in a list of cells neighboring the eNB 100 in operation 410. When the eNB 100 ascertains that at least one of the cells under the peer eNB is contained in a list of cells neighboring the eNB 100 in operation 410, it proceeds with operation 430. When the eNB 100 ascertains that at least one of the cells under the peer eNB is not contained in a list of cells neighboring the eNB 100 in operation 420.

When the eNB 100 ascertains that the peer eNB does not neighbor the eNB 100 in operation 410, it may not contain information regarding its neighboring cell in a message to be transferred to the peer eNB in operation 420. That is, the eNB 100 may leave the Neighbor Information IE empty. After that, the eNB 100 proceeds with operation 440.

On the other hand, when the eNB 100 ascertains that the peer eNB neighbors the eNB 100 in operation 410, it may contain information regarding its neighboring cell in a message to be transferred to the peer eNB in operation 430. The information regarding a neighboring cell of the eNB 100 may contain at least one of the following: a CGI, a PCI, a frequency band, and a tracking area code of a cell in a list of cells neighboring the eNB 100. The information regarding a neighboring cell may be contained in Neighbor Information IE. After that, the eNB 100 proceeds with operation 440.

The eNB 100 is capable of transferring, to a peer eNB, at least one of the following: an X2 setup request message, X2 SETUP REQUEST, an X2 setup response message, X2 SETUP RESPONSE, and an eNB configuration update message, eNB CONFIGURATION UPDATE in operation 440.

Reporting Status of Resource Utilization

The central entity 110 is capable of receiving information considered scheduling from the eNB 100 and allocating resources for transfer of data to the eNB 100.

The information considered scheduling may contain channel statuses of individual UE devices. To this end, the eNB 100 is capable of allocating resources to transfer RS. When the eNB 100 allocates resources to transfer RS, UE performs measurement RS or transfer of RS (in case of SRS) via corresponding resources. In order to allocate resources for transfer of RS and/or data, the central entity 110 needs information to determine whether a corresponding resource is the correct resource to use.

Not all resources may be used to perform transfer of RS and/or data. In this case, the eNB needs to inform the central entity 110 of: available resources and how to use available resources; or in less detail, unavailable resources.

Figure 5:
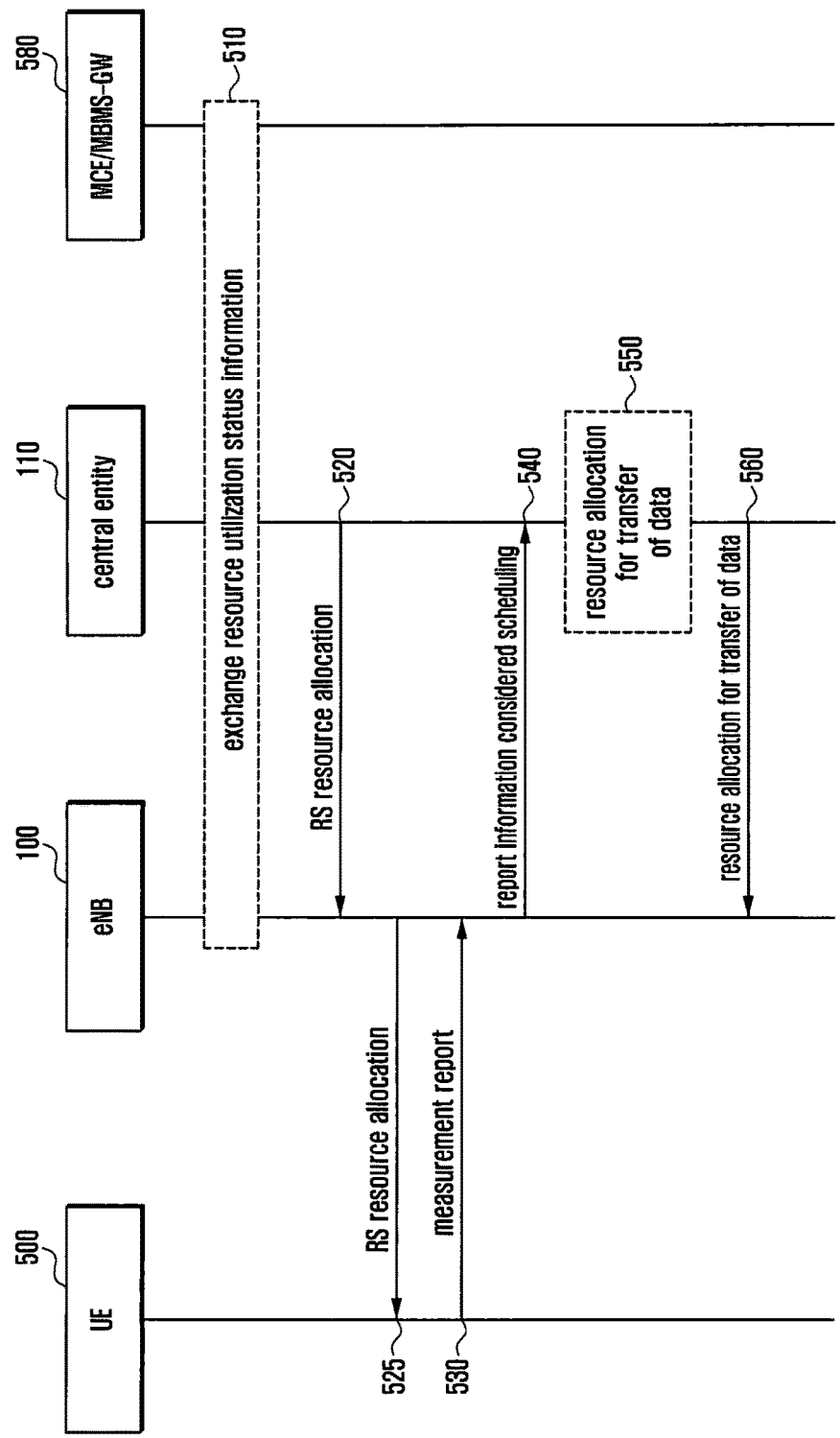
FIG. 5 is a flowchart that describes the flow of messages for resource allocation.

FIG. 5 is a flowchart that describes the flow of messages for resource allocation.

The eNB 100 and the central entity 110 are capable of exchanging resource utilization status information with each other in operation 510. In the present disclosure and the appended claims, the term 'resource utilization status information' is also used in the sense of 'resource allocation information.' This information is transferred via an X2 interface or C1 interface in various types of connection as shown in FIGS. 2a to 2c. The eNB 100 is capable of notifying the central entity 110 of information regarding a type of use of a particular resource via an X2 or C1 message. The information may have a form to notify a type of use of at least one of the following: a Resource Block (RB), a RB Group (RBG), a subframe, and a radio frame. The type of use refers to at least one of the following: Multimedia Broadcast/Multicast Service (MBMS), relay, Time Domain Inter-Cell Interference Coordination (TD-ICIC), and Frequency Domain Inter-Cell Interference Coordination (FD-ICIC). When the eNB 100 semi-persistently allocates resources to UE, information that the eNB 100 notifies to the central entity 110 contains Semi-Persistent Scheduling (SPS)-related information.

MBMS-related resource utilization status information may be provided based on the following table 1. The eNB 100 is capable of transferring: information notifying of information regarding subframes configured for MBMS; and information as to whether a corresponding subframe is in use. For example, the eNB 100 may transfer: information as to whether MBMS single frequency network or Multicast Broadcast Single Frequency Network (MBSFN) subframes according to allocation settings are in use; or MBSFN local identifiers allocated according to MBSFN subframe allocation settings.

Table 1 describes examples of resource utilization information and configuration information.

TABLE 1

| IE/Group Name | Presence | Range | IE type and reference | Criticality | Assigned Criticality |
|---|---|---|---|---|---|
| MBSFN Subframe Info | | 0 ... <maxnoofMBSFN> | | GLOBAL | ignore |
| >Radioframe Allocation Period | M | | ENUMERATED (n1, n2, n4, n8, n16, n32, ... ) | — | — |
| >Radioframe Allocation Offset | M | | INTEGER (0 ... 7, ... ) | — | — |
| >Subframe Allocation | M | | | — | — |
| >MBSFN Subframe Under Use | O | | ENUMERATED (Under Use, Not Under Use, ... ) | | |
| >MBSFN Area ID | | 0 | INTEGER (0 ... 255) | | |

The central entity 110 is capable of transferring a message allocating RS resources to the eNB 100 in operation 520. The eNB 100 is capable of actually allocating RS resources to UE 500 in operation 525. The central entity 110 and/or the eNB 100 may consider the resource utilization status information, exchanged in operation 510, in operation 520 or 525. For example, the central entity 110 and/or the eNB 100 may not allocate the subframe in use for MBMS as an RS resource.

The central entity 110 is capable of transferring a message allocating RS resources to the eNB 100 in operation 520. The eNB 100 is capable of actually allocating RS resources to UE 5000|| RS in operation 525. The central entity 110 and/or the eNB 100 may consider the resource utilization status information, exchanged in operation 510, in operation 520 or 525. For example, the central entity 110 and/or the eNB 100 may not allocate the subframe in use for MBMS as an RS resource.

UE 500 is capable of measuring RS or transferring RS (SRS) via the allocated resource in operation 530. UE 500 is also capable of reporting the measurement result of RS to the eNB 100 in operation 530. The eNB 100 is capable of reporting, to the central entity 110, the measurement result reported from the UE 500 and information considered scheduling in operation 540.

The central entity 110 allocates resources for the transfer of data, based on information received from the eNB 100 in operation 550. To this end, the central entity 110 may perform resource allocation considering resource utilization status information. For example, the central entity 110 may not allocate a subframe in use for MBMS as a resource for transfer of data.

When the central entity 110 notifies the eNB 100 of the resource allocation result for data transfer, the eNB 100 additionally performs resource allocation to transfer data to the UE 500, based on the resource allocation result in operation 560. The resource allocation result for transfer of data may correspond to coordinated multi-points hypothesis.

MBMS scheduling information varies, and this causes simultaneous change in MBMS-related resource utilization status information in eNBs 100, so that the changed information can be simultaneously transferred to the central entity 110. In this case, the central entity 110 may be overloaded. In order to prevent this phenomenon, it may be set so that only part of the eNB 100/cell in one MBSFN local area and/or one MBMS service area can transfer MBMS-related resource utilization status information.

Frequent Data Transmission

Since scheduling is performed considering a channel status of UE 500 which instantly varies, the central entity 110 and the eNB 100 need to exchange information with each other during a relatively short cycle. For example, the message used in operations 540 and 560 needs to be transferred in a time interval of 1 to a few milliseconds.

The X2 interface uses a Stream Control Transmission Protocol (SCTP) in a Transport Layer (TL). In general, an SCTP is appropriate in terms of precision but may not be suitable for transfer of data which needs to be transferred in a relatively short time interval. Therefore, when the eNB 100 and the central entity 110 exchange data with each other via the X2 interface, they need an SCTP in a particular mode.

When data is not correctly transferred via a general SCTP, the data is re-transferred. Therefore, it may be proper for the eNB 100 and the central entity 110 to transfer data in an unreliable data transfer mode (unreliable data mode) where, although there is a difficulty in transferring data between the eNB 100 and the central entity 110, re-transfer of data does not need to performed.

Therefore, the eNB 100 is capable of transferring data to an eNB via a general SCTP and to another eNB (e.g., an eNB including a central entity 110) via an SCTP of an unreliable data transfer mode (unreliable data mode SCTP). To this end, eNBs need a procedure for negotiating an SCTP mode with each other.

Figure 6:
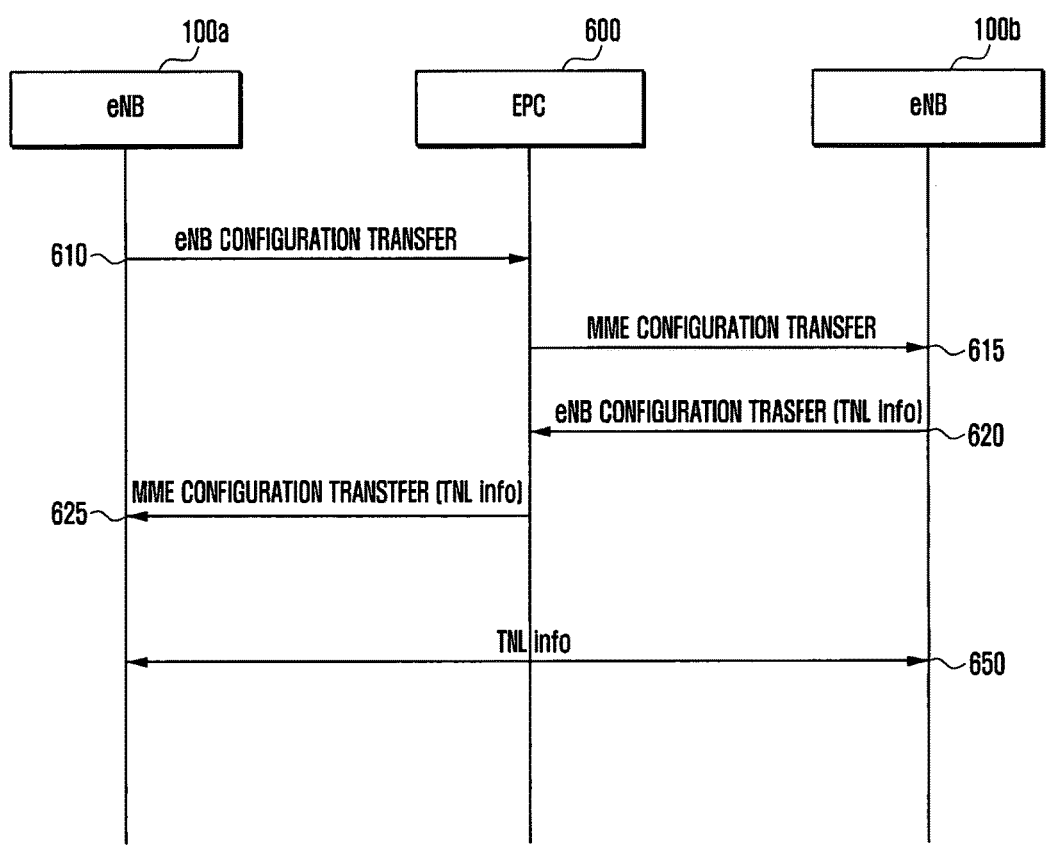
FIG. 6 is a flowchart that describes a method of exchanging information between an eNB and an EPC.

FIG. 6 is a flowchart that describes a method of exchanging information between an eNB and an EPC.

One eNB 100a requests information from an EPC 600 in order to connect to another eNB 100b via an X2 interface 120 in operation 610. The information request may refer to a message requesting TL information regarding the other eNB 100b, e.g., an eNB configuration transfer message, eNB CONFIGURATION TRANSFER. The EPC 600 may refer to a Mobile Management Entity (MME). MMEs may transfer the request message to each other.

The EPC 600 is capable of transferring, to the other eNB 100b, an MME configuration transfer message, MME CONFIGURATION TRANSFER, and informing the eNB 100b that the eNB 100a has requested the TL information in operation 615. The eNB 100b is capable of containing the TL information in an eNB configuration transfer message, eNB CONFIGURATION TRANSFER, and transferring the message to the EPC 600 in operation 620. The TL information may contain at least one of the following: a TL address, an SCTP mode, and a TL protocol (an SCTP or a User Datagram Protocol (UDP)). The TL information may be transferred from one MME to another in the EPC 600. The following table 2 describes an example of the TL information configuration.

TABLE 2

| IE/Group Name | Presence | Range | IE type and reference | Criticality | Assigned Criticality |
|---|---|---|---|---|---|
| eNB X2 Transport Layer Addresses | | 1 ... <maxnoofeNBX2TLAs> | | | |
| >Transport Layer Address | M | | BIT STRING (1 ... 160, ... ) | | |
| eNB X2 Extended Transport Layer Addresses | | 1 ... <maxnoofeNBX2ExtTLAs> | | YES | ignore |
| >IP-Sec Transport Layer Address | O | | BIT STRING (1 ... 160, ... ) | — | — |
| >eNB GTP Transport Layer Addresses | | 1 ... <maxnoofeNBX2GTPTLAs> | | — | — |
| >>GTPTransport Layer Address | M | | BIT STRING (1 ... 160, ... ) | — | — |
| eNB X2 Transport Layer Protocol Mode | O | | ENUMERATED (Reliable, Unreliable, ... ) | | |
| eNB X2 Transport Layer Protocol | O | | ENUMERATED (SCTP, UDP, ... ) | | |

The EPC 600 is capable of transferring, to the eNB 100a, the MME configuration transfer message, MME CONFIGURATION TRANSFER in operation 625. The message may contain TL information.

When the eNB 100a is connected to another eNB 100b based on the TL information received from that EPC 600, it may determine a type of SCTP mode or a type of protocol for the connection. The eNB 100a is capable of transferring the selected TL information via the X2 setup process and/or eNB configuration update process in operation 650.

Figure 7:
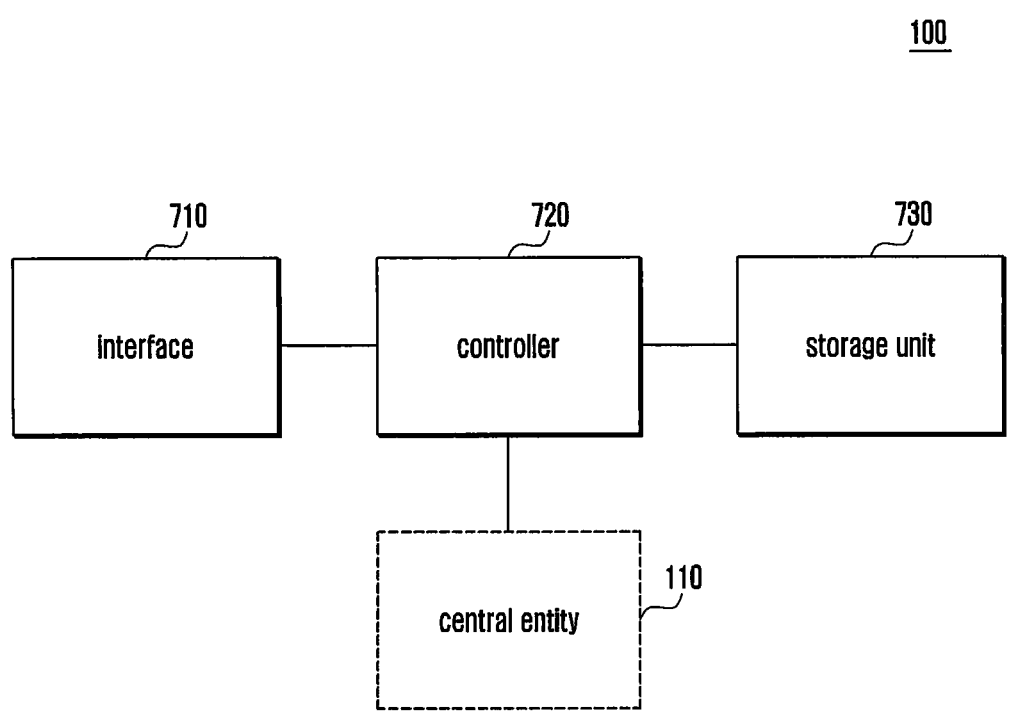
FIG. 7 is a block diagram of an eNB 100 according to an embodiment of the present invention.

FIG. 7 is a block diagram of an eNB 100 according to an embodiment of the present invention.

Referring to FIG. 7, the eNB 100 is capable of including an interface 710, a controller 720 and a storage unit 730.

The interface 710 is capable of communicating with other eNBs, a central entity or UE, in wired communication and/or wireless communication, under the control of the controller 720. The interface 710 is implemented with an X2 interface 120 or C1 interface.

The controller 720 is capable of: identifying whether at least one cell under a peer eNB neighbors the eNB 100; determining whether it includes information regarding a neighboring cell in an eNB-related message based on the identification result; and transferring the eNB-related message to the peer eNB based on the determination result. The controller 720 is capable of determining whether at least one cell under the peer eNB is contained in a list of neighboring cells of the eNB. When the controller 720 ascertains that at least one cell under the peer eNB neighbors the eNB, it may include the information regarding the neighboring cell in the eNB-related message. When the controller 720 ascertains that at least one cell under the peer eNB does not neighbor the eNB, it may not contain the information regarding a neighboring cell in the eNB-related message. The eNB-related message may contain at least one of the following: an X2 setup request message, X2 SETUP REQUEST, an X2 setup response message, X2 SETUP RESPONSE, and an eNB configuration update message, eNB CONFIGURATION UPDATE.

When the controller 720 exchanges resource allocation information with a central entity and receives a channel measurement result from UE, it reports information considered scheduling to the central entity. When the controller 720 is allocated resources for transfer of data from the central entity, it is capable of performing resource allocation to transfer data to the UE. Before receiving the channel measurement result from the UE, the controller 720 is capable of allocating RS resources to the UE, based on the allocation information regarding the RS resources, received from the central entity. In order to exchange data with the central entity via an X2 interface, the controller 720 may request corresponding information from the central entity via a node of a core network.

The storage unit 730 is capable of storing information, etc., received from other eNBs, a central entity, UE or nodes of a core network.

Referring to FIG. 7, the eNB 100 is capable of further including a central entity 110. For example, the eNB may be implemented to include an apparatus serving as a central entity as shown in FIG. 2b or 2c. Alternatively, the eNB may be implemented to include a software program for performing functions of a central entity.

Figure 8:
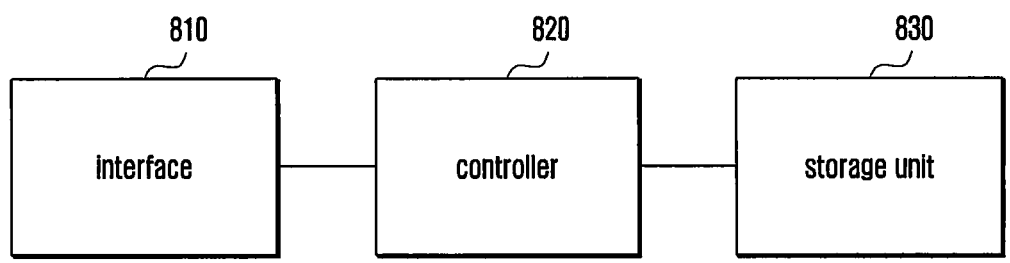
FIG. 8 is a block diagram of a node in a core network according to an embodiment of the present invention.

FIG. 8 is a block diagram of a node in a core network according to an embodiment of the present invention.

The node is implemented with a Mobile Management Entity (MME). As shown in FIG. 8, the node is capable of including an interface 810, a controller 820 and a storage unit 830.

The interface 810 is capable of communicating with another node of a core network (e.g., MME), eNBs, or a central entity, under the control of the controller 820.

When the controller 820 receives an information request from a first eNB, it may request information from a second eNB. When the controller 820 receives information from the second eNB, it may transfer the received information to the first eNB. The information may contain Transport Layer (TL) information.

The storage unit 830 is capable of storing information, etc., received from another node of a core network, eNBs or a central entity.

In the embodiments described above, operations and messages may be optionally or selectively processed or omitted. It should be understood that the operations described in the embodiments may be performed in a different order from the embodiments. It should also be understood that the messages described in the embodiments may be transferred in a different order from the embodiments.

It should be understood that the considerations in exchanging messages between the eNB 100 and the central entity 110, described above in the embodiments of the present invention, may also be applied to the exchange of messages between two eNBs.

The invention claimed is:

1. A method by a first base station supporting a coordinated multi-point transmission and reception (CoMP), comprising:
   determining a second base station to setup an X2 interface;
   determining whether a list of neighbor cells of the first base station includes at least one of serving cells of the second base station;
   transmitting, to the second base station, an X2 setup request message including information on the neighbor cells of the first base station, when the list of the neighbor cells of the first base station includes the at least one of the serving cells of the second base station, wherein the information on the neighbor cells of the first base station is used by the second base station to configure a physical cell identifier for the serving cells of the second base station; and
   transmitting, to the second base station, the X2 setup request message without the information on the neighbor cells of the first base station, when the list of the neighbor cells of the first base station does not include the at least one of the serving cells of the second base station.

2. The method of claim 1, wherein the list of the neighboring cells of the first base station comprises at least one of the following:
   one or more cells of base stations connected to the first base station via X2,
   one or more cells in a report of measurement information received from the terminal,
   one or more cells of base stations from which the first base station heard related information over the air,
   one or more cells set by a network configuration and/or Operation, Administration and Maintenance (OAM), and
   one or more cells included in a Neighbor Relation Table (NRT).

3. The method of claim 1, further comprising:
   receiving, from the second base station, an X2 setup response message.

4. The method of claim 1, wherein information on neighbor cells of the second base station is included in an X2 setup response message when a list of neighbor cells of the second base station includes at least one of serving cells of the first base station.

5. The method of claim 1, wherein the information on the neighbor cells of the first base station comprises at least one of the following:
   a Cell Global Identifier (CGI),
   a Physical Cell Identifier (PCI),
   a frequency band, and
   a tracking area code.

6. The method of claim 1, wherein the information on the neighbor cells is included in a Neighbor Information Element (IE).

7. A first base station supporting a coordinated multi-point transmission and reception (CoMP), comprising:
   an interface; and
   a controller connected with the interface and configured to control to:
      determine a second base station to setup an X2 interface;
      determine whether a list of neighbor cells of the first base station includes at least one of serving cells of the second base station;
      transmit, to the second base station, an X2 setup request message including information on the neighbor cells of the first base station, when the list of the neighbor cells of the first base station includes the at least one of the serving cells of the second base station, wherein the information on the neighbor cells of the first base station is used by the second base station to configure a physical cell identifier for the serving cells of the second base station; and
      transmit, to the second base station, the X2 setup request message without the information on the neighbor cells of the first base station, when the list of the neighbor cells of the first base station does not include the at least one of the serving cells of the second base station.

8. The first base station of claim 7, wherein the list of the neighboring cells comprises at least one of the following:
   one or more cells of base stations connected to the first base station via X2,
   one or more cells in a report of measurement information received from the terminal,
   one or more cells of base stations from which the first base station heard related information over the air,
   one or more cells set by a network configuration and/or Operation, Administration and Maintenance (OAM), and
   one or more cells included in a Neighbor Relation Table (NRT).

9. The first base station of claim 7, wherein the controller is further configured to:
   receive, from the second base station, an X2 setup response message.

10. The first base station of claim 7, wherein information on neighbor cells of the second base station is included in an X2 setup response message, when a list of neighbor cells of the second base station includes at least one of serving cells of the first base station.

11. The first base station of claim 7, wherein the information on the neighbor cells comprises at least one of the following:
   a Cell Global Identifier (CGI),
   a Physical Cell Identifier (PCI),
   a frequency band, and
   a tracking area code.

12. The first base station of claim 7, wherein the information on the neighbor cells is included in a Neighbor Information Element (IE).

* * * * *